March 31, 1936. S. M. UDALE 2,035,681
CARBURETOR
Filed March 23, 1935
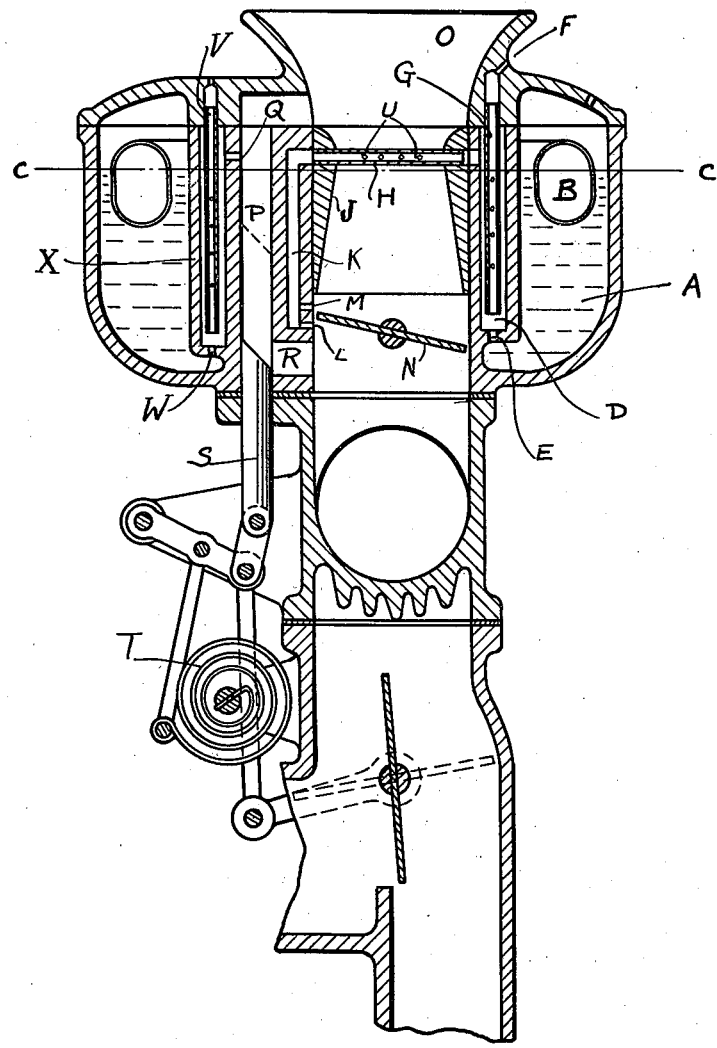
Stanley M. Udale
INVENTOR Patented Mar. 31, 1936

2,035,681

UNITED STATES PATENT OFFICE 2,035,681

CARBURETOR

Stanley M. Udale, Detroit, Mich., assignor to Milton E. Chandler, Detroit, Mich.

Application March 23, 1935, Serial No. 12,548

1 Claim. (Cl. 261—41)

The object of this invention is to improve the low speed performance of a car by providing a carburetor having a low speed nozzle directly connected to a main fuel nozzle in such a way that there is no hesitation when transferring from the low speed nozzle to the main fuel nozzle. Heretofore there has been considerable delay due to the fact that there came a time in the operation of a carburetor when the fuel had two alternative paths to take and therefore there was a hesitation on the part of the fuel as to which path to take.

If the low speed fuel passage is arranged in series with the main fuel nozzle so that the operation of the low speed fuel nozzle automatically primes the main fuel nozzle, then the sudden opening of the throttle will find the main fuel nozzle in condition to discharge immediately. I have also discovered that if the low speed fuel nozzle forms with the main fuel nozzle an inverted U and the main fuel nozzle operates to break the siphon, then the low speed fuel nozzle can discharge below the level maintained in the fuel supply chamber.

The figure shows the preferred form of my invention.

In the figure, A is the float chamber having a float B maintaining a level at C—C. The float mechanism is not shown. The fuel flows from A to an air vented well D supplied with fuel through a restricted orifice E. The air vented well is vented to the atmosphere at F and is provided with a perforated tube G which discharges the air admitted at F below the level C—C in the well D through a number of outlets.

A high speed fuel nozzle H consists of a perforated tube connected to the outlet from the air vented well. H is located transversely of the throat of a venturi J which forms the mixing chamber. A low speed by-pass K is connected at its upper end with the high speed fuel nozzle H and at its lower end with two low speed fuel outlets L and M. M is located on the atmospheric side of a butterfly throttle N. L is located on the engine side. Obviously as the throttle opens the outlet M becomes located on the engine side of N and both L and M are subjected to the engine suction. High speed fuel outlets U—U, provided in H, act as air vents to the low speed fuel passage H—K when the engine is operating under closed throttle.

A bell-shaped air entrance O is provided.

A second by-pass P is provided to which a fuel nozzle Q discharges, which by-pass P communicates with an outlet R on the engine side of the throttle N. The outlet R is controlled by a valve S controlled by a thermostat T. This portion of the carburetor is covered by a patent application, Serial No. 590,898, filed by George M. Holley, February 2, 1932.

This orifice Q derives its fuel from a well X vented to the atmosphere through a perforated tube V and communicating with the float chamber A through a restricted fuel inlet W.

*Operation*

When operating at low speed, with the passage P closed, low speed fuel is discharged out of L and M together with a little air drawn in at F and considerable air drawn in through the opening U—U in the high speed fuel nozzle H. As the throttle is opened the depression at U increases until no air enters through U and eventually fuel begins to issue out of the openings U and the amount of fuel discharging out of L and M begins to decrease, but the transfer from L and M to U—U is gradual and it is this gradual transfer which constitutes the gist of my invention. The fuel passages E, D, H, K, L and M form an inverted U-shaped passage which would act as a siphon if the horizontal leg H of the U were not vented through the openings U—U to the Venturi passage J. The location of the low speed fuel outlets L and M below the level C—C in the float chamber, together with venting of the siphon through the openings U—U, gives improved low speed performance, which is the object of this invention.

What I claim is:

In a carburetor a constant level fuel supply chamber, a mixture chamber of Venturi form, a mixture outlet leading therefrom, a throttle valve located therein below the level in said supply chamber, an inverted U-shaped fuel passage having one leg extending below the level in said fuel supply chamber and having a restricted fuel entrance, the other leg of the U extending to a point below the level but outside of said chamber and communicating with said mixture outlet adjacent to, and posterior of said throttle valve, a connecting passage connecting the legs of said U-shaped fuel passage located in a plane above said level in said chamber and transversely of said mixing chamber, an opening in said connecting passage communicating with the point of greatest suction in said venturi, said opening being adapted to break the siphon in said U passage when air ceases to flow through said venturi and to act as a fuel outlet when the throttle is opened.

STANLEY M. UDALE.